United States Patent
Abe et al.

(10) Patent No.: US 8,530,547 B2
(45) Date of Patent: Sep. 10, 2013

(54) CHLOROPRENE RUBBER COMPOSITION AND ITS APPLICATION

(75) Inventors: Yasushi Abe, Itoigawa (JP); Hiroyuki Ishiguro, Itoigawa (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 568 days.

(21) Appl. No.: 12/677,554

(22) PCT Filed: Sep. 12, 2008

(86) PCT No.: PCT/JP2008/066598
§ 371 (c)(1),
(2), (4) Date: Mar. 11, 2010

(87) PCT Pub. No.: WO2009/035109
PCT Pub. Date: Mar. 19, 2009

(65) Prior Publication Data
US 2010/0209644 A1    Aug. 19, 2010

(30) Foreign Application Priority Data

Sep. 14, 2007  (JP) ................................ 2007-238945

(51) Int. Cl.
*B32B 1/08*         (2006.01)
*C08K 3/04*         (2006.01)

(52) U.S. Cl.
USPC ............. 524/32; 524/300; 524/495; 524/496; 524/106; 524/93; 524/439; 524/435; 524/551; 524/552; 524/847

(58) Field of Classification Search
USPC ............. 524/32, 300, 496, 106, 93, 439, 435, 524/551, 552, 847
See application file for complete search history.

(56) References Cited

U.S. PATENT DOCUMENTS

| | | | |
|---|---|---|---|
| 6,147,154 A * | 11/2000 | Fujii et al. ...................... | 524/571 |
| 6,495,625 B1 | 12/2002 | Abe et al. | |
| 2004/0126306 A1 * | 7/2004 | Ochiai et al. .................. | 423/448 |

FOREIGN PATENT DOCUMENTS

| | | |
|---|---|---|
| EP | 0 016 562 A1 | 10/1980 |
| EP | 0 937 746 A1 | 8/1999 |
| EP | 1 148 094 A1 | 10/2001 |
| JP | 2 166135 | 6/1990 |
| JP | 2 189342 | 7/1990 |
| JP | 3 76734 | 4/1991 |
| JP | 8 127673 | 5/1996 |
| JP | 9 291178 | 11/1997 |
| JP | 9 295371 | 11/1997 |
| JP | 2001 131341 | 5/2001 |
| JP | 2001 131342 | 5/2001 |
| JP | 2002-105246 * | 4/2002 |
| JP | 2004 100807 | 4/2004 |
| JP | 2004 123887 | 4/2004 |
| JP | 2005 60581 | 3/2005 |
| JP | 2005 281629 | 10/2005 |

OTHER PUBLICATIONS

Machine Translation of JP 8-127673A; 1996.*
Office Action issued Apr. 25, 2011, in China Patent Application No. 200880106550.4 (with English translation).
"Addition Agent", of second fascicule of "Rubber Industry Manual" published by Chemical Industry Publishing Company, Jun. 1981, p. 165 (with cover pages).
Extended European Search Report issued Sep. 16, 2011, in Patent Application No. 08830351.6.

* cited by examiner

*Primary Examiner* — Robert D. Harlan
(74) *Attorney, Agent, or Firm* — Oblon, Spivak, McClelland, Maier & Neustadt, L.L.P.

(57) ABSTRACT

To provide a chloroprene rubber composition with which a vulcanized rubber having further improved heat resistance without impairing mechanical properties, the compression set and the tension fatigue can be obtained, and a rubber member for an automobile, a hose, a rubber molded article and a rubber vibration insulator comprising the vulcanized rubber.

A chloroprene rubber composition, which comprises 100 parts by mass of at least one chloroprene rubber selected from the group consisting of a xanthogen-modified chloroprene rubber and a mercaptan-modified chloroprene rubber, and from 15 to 200 parts by mass of carbon black having a number average particle size of from 70 nm to 600 nm and having a DBP oil absorption of from 15 ml/100 g to 60 ml/100 g by oil absorption method A of JIS K6221.

15 Claims, No Drawings

US 8,530,547 B2

CHLOROPRENE RUBBER COMPOSITION AND ITS APPLICATION

TECHNICAL FIELD

The present invention relates to a chloroprene rubber composition containing specific carbon black. Further, it relates to a vulcanized rubber obtained by vulcanizing the chloroprene rubber composition, and a rubber member for an automobile, a hose, a rubber molded article and a rubber vibration insulator, comprising the vulcanized rubber.

BACKGROUND ART

A chloroprene rubber is excellent in mechanical properties, weather resistance, flame retardancy, etc. and is widely used as a material for industrial rubber components. Properties required for such industrial rubber components are remarkably high, and one having the above properties such as mechanical properties, weather resistance and flame retardancy maintained and in addition, being excellent in ozone resistance and heat resistance is required.

As a means to improve ozone resistance of a chloroprene rubber, a technique of blending an epichlorohydrin polymer rubber and a vulcanizer (e.g. Patent Document 1), a rubber composition comprising an ethylene/propylene/diene copolymer rubber and an antioxidant blended (e.g. Patent Documents 2 and 3), etc. have been known.

As a means to improve heat resistance of a chloroprene rubber, a technique of blending a chloroprene rubber with an aluminum salt of a specific fatty acid (e.g. Patent Document 4) or a technique of blending a chloroprene rubber with specific carbon black, a zinc powder and a specific plasticizer (e.g. Patent Document 5) etc. have been known.

Patent Document 1: JP-A-2004-123887
Patent Document 2: JP-A-H09-291178
Patent Document 3: JP-A-H02-189342
Patent Document 4: JP-A-2005-281629
Patent Document 5: JP-A-2005-060581

DISCLOSURE OF THE INVENTION

Object to be Accomplished by the Invention

The chloroprene rubbers obtained by means disclosed in Patent Documents 1 to 3 had insufficient balance of mechanical properties, the compression set and the heat resistance, although ozone resistance was improved. Further, the chloroprene rubber composition containing an ethylene/propylene/diene copolymer rubber has insufficient heat resistance, since sulfur is used as a vulcanizer. The chloroprene rubbers by means disclosed in Patent Documents 4 and 5 had improved heat resistance, but they were required to have further heat resistance for the purpose of being used under more severe environment.

Accordingly, it is an object of the present invention to provide a chloroprene rubber composition with which a vulcanized rubber having further improved heat resistance can be obtained without impairing mechanical properties, the compression set and the tension fatigue, and to provide a rubber member for an automobile, a hose, a rubber molded article and a rubber vibration insulator, comprising the vulcanized rubber.

Here, a rubber molded article is one obtained by filling a mold for vulcanization with a chloroprene rubber composition or with a chloroprene rubber composition and a metal, fibers or the like in combination, followed by heating under pressure to mold the composition into a predetermined shape, followed by vulcanization.

Means to Accomplish the Object

That is, the present invention provides a chloroprene rubber composition, which comprises 100 parts by mass of at least one chloroprene rubber selected from the group consisting of a xanthogen-modified chloroprene rubber and a mercaptan-modified chloroprene rubber, and from 15 to 200 parts by mass of carbon black having a number average particle size of from 70 nm to 600 nm and having a DBP oil absorption of from 15 ml/100 g to 60 ml/100 g by oil absorption method A of JIS K6221.

Further, it preferably further contains from 0.1 to 3 parts by mass of an imidazole compound per 100 parts by mass of the chloroprene rubber, and the imidazole compound is preferably at least one member selected from the group consisting of 2-mercaptobenzimidazole and 1-benzyl-2-ethylimidazole.

The chloroprene rubber composition may be vulcanized to obtain a vulcanized rubber.

Further, the vulcanized rubber can be utilized as a rubber member for an automobile, a hose, a rubber molded article and a rubber vibration insulator.

Effects of the Invention

According to the present invention, a chloroprene rubber composition with which a vulcanized rubber having further improved heat resistance can be obtained without impairing mechanical properties, the compression set and the tension fatigue, can be provided. The obtained vulcanized rubber can be utilized as a rubber member for an automobile, a hose, a rubber molded article and a rubber vibration insulator.

BEST MODE FOR CARRYING OUT THE INVENTION

The chloroprene rubber of the present invention is a homopolymer of chloroprene or a copolymer of chloroprene with another monomer copolymerizable with chloroprene. The monomer copolymerizable with chloroprene may, for example, be 2,3-dichloro-1,3-butadiene, 1-chloro-1,3-butadiene, styrene, acrylonitrile, methacrylonitrile, isoprene, butadiene, acrylic acid or methacrylic acid, or an ester thereof, and they may be used within a range satisfying the object of the present invention.

Among them, as the monomer, 2,3-dichloro-1,3-butadiene, 1-chloro-1,3-butadiene, isoprene or methacrylic acid is preferably used.

A polymerization method to obtain a chloroprene rubber is not particularly limited, and conventional polymerization method may be used. For example, the chloroprene rubber can be obtained by emulsion polymerization of a chloroprene monomer by a conventional method in the presence of a polymerization initiator commonly used for polymerization of chloroprene.

As the polymerization initiator, a known organic peroxide which is commonly used for emulsion polymerization of chloroprene, such as potassium persulfate, ammonium persulfate, sodium persulfate, hydrogen peroxide or t-butyl hydroperoxide may be used.

In the case of carrying out emulsion polymerization, an emulsifier is not particularly limited, and an emulsifier commonly used for emulsion polymerization of chloroprene, such as an alkali metal salt of a $C_{6\text{-}22}$ saturated or unsaturated fatty acid, an alkali metal salt of a rosin acid or a disproportionated rosin acid, or an alkali metal salt of a formalin condensate of β-naphthalene sulfonic acid, may be used. As the emulsifier, an alkali metal salt of a rosin acid or a disproportionated rosin acid is preferably used.

The polymerization temperature and the final degree of conversion of chloroprene are not particularly limited. However, the polymerization temperature is preferably from 0 to 50° C., more preferably from 20 to 50° C. Further, it is preferred to carry out the polymerization so that the final degree of conversion of chloroprene falls into a range of from 50 to 95 mass %, more preferably from 55 to 85 mass %. In order to adjust the final degree of conversion, when a desired degree of conversion is achieved, a polymerization inhibitor to terminate the polymerization reaction is added to terminate the polymerization.

As the polymerization inhibitor, a commonly used polymerization inhibitor can be used, and it is not particularly limited. It may, for example, be thiodiphenylamine, 4-tert-butylcatechol or 2,2-methylenebis-4-methyl-6-tert-butylphenol.

Unreacted chloroprene in the emulsion polymerization reaction is removed, for example, by a steam stripping method, and then, the pH of the solution is adjusted, and steps in a conventional method, such as freezing, washing with water and hot air drying are carried out to obtain a chloroprene rubber.

A chloroprene rubber modified type is classified into a mercaptan-modified type, a xanthogen-modified type and a sulfur-modified type depending on the type of a molecular weight modifier.

In the present invention, at least one modified type of a chloroprene rubber selected from the group consisting of a xanthogen-modified chloroprene rubber and a mercaptan-modified chloroprene rubber is used.

A xanthogen-modified chloroprene rubber is excellent in mechanical properties such as tensile strength and elongation at break as compared with other modified types, and by using it, a chloroprene rubber composition having such mechanical properties improved can be obtained.

A mercaptan-modified chloroprene rubber is excellent in bonding properties with a metal as compared with other modified types, with which a chloroprene rubber composition having improved adhesion to a metal can be obtained.

A mercaptan-modified type is one obtained by using as a molecular weight modifier an alkyl mercaptan such as n-dodecyl mercaptan, tert-dodecyloctyl mercaptan or octyl mercaptan.

A xanthogen-modified type is one obtained by using as a molecular weight modifier an alkyl xanthogen compound.

Such a modified type chloroprene rubber can properly adjust properties of a chloroprene rubber composition obtainable by its use in combination. It is not particularly limited, but in a case where it is an object to improve the heat resistance of a chloroprene rubber composition, the blend ratio of a mercaptan-modified chloroprene rubber is preferably at most 45 mass %, preferably at most 40 mass % to 100 mass % of total chloroprene rubber. The lower limit is not particularly limited, but is 5 mass %.

In the present invention, an imidazole compound is blended to improve the fatigue resistance against e.g. tension fatigue of a chloroprene rubber, and a commercially available product may be used.

The imidazole compound is not particularly limited, and it may, for example, be 2-mercaptobenzimidazole, 1-methylimidazole, 1,2-dimethylimidazole, 1-methyl-2-ethylimidazole, 1-benzyl-2-ethylimidazole, 1-benzyl-2-ethyl-5-methylimidazole, 1-benzyl-2-phenylimidazole, 1-benzyl-2-phenylimidazole trimellitate, 1-aminoethylimidazole, 1-aminoethyl-2-methylimidazole, 1-aminoethyl-2-ethylimidazole, 1-cyanoethyl-2-methylimidazole, 1-cyanoethyl-2-phenylimidazole, 1-cyanoethyl-2-ethyl-4-methylimidazole, 1-cyanoethyl-2-undecylimidazole, 1-cyanoethyl-2-methylimidazole trimellitate, 1-cyanoethyl-2-phenylimidazole trimellitate, 1-cyanoethyl-2-ethyl-4-methylimidazole trimellitate, 1-cyanoethyl-2-undecyl-imidazole trimellitate, 2,4-diamino-6-[2'-methylimidazolyl-(1)']ethyl-s-triazine/isocyanuric acid adduct, 1-cyanoethyl-2-phenyl-4,5-di-(cyanoethoxymethyl)imidazole, N-(2-methylimidazolyl-1-ethyl)urea, N,N'-bis-(2-methylimidazolyl-1-ethyl)urea, 1-(cyanoethylaminoethyl)-2-methylimidazole, N,N'-[2-methylimidazolyl-(1)-ethyl]-adipoyldiamide, N,N'-[2-methylimidazolyl-(1)-ethyl]-dodecane dioyldiamide, N,N'-[2-methy imidazolyl-(1)-ethyl]-eicosane dioyldiamide, 2,4-diamino-6-[2'-methylimidazolyl-(1)']-ethyl-s-triazine, 2,4-diamino-6-[2'-undecylimidazolyl-(1)']-ethyl-s-triazine, 1-dodecyl-2-methyl-3-benzylimidazolium chloride or 1,3-dibenzyl-2-methylimidazolium chloride. They may be used alone or in combination of two or more of them. Among such compounds, particularly when 2-mercaptobenzimidazole or 1-benzyl-2-ethylimidazole is used, the chloroprene rubber is efficiently vulcanized, and the fatigue resistance against e.g. tension fatigue can be improved.

The amount of the imidazole compound blended is from 0.1 to 3 parts by mass, preferably from 0.3 to 1.5 parts by mass per 100 parts by mass of the xanthogen-modified chloroprene rubber. When the amount of the imidazole compound is within such a range, the fatigue resistance can be improved without decreasing the compression set of the vulcanized rubber to be obtained.

In the present invention, carbon black is a reinforcing agent blended to improve mechanical properties of a vulcanized rubber to be obtained by vulcanizing the chloroprene rubber composition, and a commercially available product may be used.

The carbon black is one having a number average particle size of from 70 nm to 600 nm, preferably from 80 nm to 500 nm, and having a DBP oil absorption of from 15 ml/100 g to 60 ml/100 g, preferably from 25 ml/100 g to 50 ml/100 g by oil absorption method A of JIS K6221. If the number average particle size or the DBP oil absorption is out of such a range, the heat resistance of the vulcanized rubber tends to be poor, and no desired chloroprene rubber composition will be obtained.

The amount of the carbon black blended may be optionally adjusted depending on the required rubber hardness of the chloroprene rubber composition. It is not particularly limited, but it is from 15 to 200 parts by mass, preferably from 20 to 100 parts by mass per 100 parts by mass of the chloroprene rubber, whereby the heat resistance of the chloroprene rubber composition to be obtained can be improved without impairing the rubber elasticity.

The chloroprene rubber composition according to the present invention is obtained by kneading the above modified type chloroprene rubber, the imidazole compound and a compound such as carbon black at a temperature of the vulcanization temperature or below. As an apparatus of kneading the chloroprene rubber composition, a conventional kneading apparatus such as a mixer, a banbury mixer, a kneader mixer or a twin roll may be mentioned. The obtained chloroprene rubber composition can be molded into a desired shape and then vulcanized to obtain a vulcanized rubber. The obtained vulcanized rubber may be molded into various shapes. As a method of molding the chloroprene rubber composition or the vulcanized rubber, a conventional method such as press molding, extrusion or calendering may be mentioned. One which is employed in conventional rubber industry may be employed.

Vulcanization of the chloroprene rubber composition of the present invention is carried out as follows. That is, commonly employed steam vulcanization or UHF vulcanization may be mentioned. The steam vulcanization is a means of vulcanizing an unvulcanized chloroprene rubber composition by applying a pressure and a temperature by a steam gas as a heating medium. The UHF vulcanization is a means of vulcanizing a plasticized chloroprene rubber composition by irradiation with microwaves. Further, at the time of press vulcanization or injection molding, while a chloroprene rubber composition is held in a mold for molding, the mold temperature may be increased to the vulcanization temperature for vulcanization.

The vulcanization temperature may properly be set depending on the blend ratio of the chloroprene rubber composition and the type of the vulcanizer, and is usually preferably from 140 to 220° C., more preferably from 150 to 180° C.

With the chloroprene rubber composition of the present invention, various additives used for a conventional chloroprene rubber can be blended to achieve desired properties. The additives may, for example, be a filler other than carbon black, a reinforcing agent, a plasticizer, a processing aid, an antioxidant, a vulcanizer and a vulcanization accelerator.

The filler other than carbon black and the reinforcing agent may, for example, be silica, clay, talc or calcium carbonate. As their addition amount, they may be added within a range not to impair the heat resistance, and the addition amount is preferably within a range of from 5 to 100 parts by mass, more preferably from 5 to 50 parts by mass per 100 parts by mass of the chloroprene rubber composition.

The plasticizer is not particularly limited so long as it is a plasticizer compatible with the chloroprene rubber. It may, for example, be a vegetable oil such as rapeseed oil, a phthalate plasticizer, a DOS (dioctyl sebacate), DOA (dioctyl adipate), an ester plasticizer, an ether/ester plasticizer, a thioether plasticizer, an aroma oil or a naphthene oil, and one or a plurality of them in combination may be used depending on properties required for the chloroprene rubber composition. The addition amount of the plasticizer is from 5 to 50 parts by mass, preferably from 5 to 30 parts by mass per 100 parts by mass of the chloroprene rubber.

The processing aid may, for example, be a fatty acid such as stearic acid, a paraffin processing aid such as polyethylene, or a fatty acid amide, and it may be added in an amount of from 0.2 to 10 parts by mass, preferably from 0.5 to 5 parts by mass per 100 parts by mass of the chloroprene rubber.

As the antioxidant, a common antioxidant such as an amine type, an imidazole type, a metal salt of carbamic acid, a phenol type or wax may be used. As an antioxidant having a high effect of improving the heat resistance, an amine type such as 4,4'-bis($\alpha,\alpha$-dimethylbenzyl)diphenylamine or octylated diphenylamine may, for example, be mentioned. Particularly, 4,4'-bis($\alpha,\alpha$-dimethylbenzyl)diphenylamine has a high effect of improving the heat resistance. Such antioxidants may be used alone or in combination.

The vulcanizer is not particularly limited but is preferably a metal oxide. Specifically, zinc oxide, magnesium oxide, lead oxide, trilead tetraoxide, iron trioxide, titanium dioxide, calcium oxide or hydrotalcite may, for example, be mentioned. They may be used in combination of two or more of them. The addition amount of such a vulcanizer is preferably from 3 to 15 parts by mass, more preferably from 5 to 12 parts by mass per 100 parts by mass of the chloroprene rubber. Further, it may be used in combination with the following vulcanization accelerator for more effective vulcanization.

As the vulcanization accelerator, a thiourea, guanidine, thiuram or thiazole type vulcanization accelerator which is commonly used for vulcanization of a chloroprene rubber may be used, and a thiourea type is preferred. The thiourea type vulcanization accelerator may, for example, be ethylenethiourea, diethylthiourea, trimethylthiourea, triethylthiourea or N,N'-diphenylthiourea, and trimethylthiourea or ethylenethiourea is particularly preferred. Further, a vulcanization accelerator such as a mixture of 3-methylthiazolidinethione-2, thiadiazole and phenylenedimaleimide, dimethylammonium hydrogen isophthalate or 1,2-dimercapto-1,3,4-thiadiazole derivative may also be used. As the vulcanization accelerator, two or more of them may be used in combination. The addition amount of such a vulcanization accelerator is preferably from 0.2 to 10 parts by mass, more preferably from 0.5 to 5 parts by mass per 100 parts by mass of the chloroprene rubber.

EXAMPLES

Now, the present invention will be described in further detail with reference to Examples, but the present invention is by no means restricted thereto.

Examples 1 to 9 and Comparative Examples 1 to 6

In accordance with the blend formulation as identified in Table 1 or 2, kneading was carried out using an 8-inch roll to prepare a sheet having a thickness of 2.3 mm.

In Tables, the blend amounts of a xanthogen-modified chloroprene rubber and the like are represented by part(s) by mass.

The obtained sheet was press vulcanized under a condition of leaving it to stand at 160° C. for 20 minutes to prepare a vulcanized sheet sample having a thickness of 2 mm and a sample for the compression set test, and physical properties such as the tensile strength, the elongation at break and the normal-state hardness, the heat resistance and the compression set were evaluated. Test methods for the respective tests are as follows.

Rubber Physical Properties Test (1) Tensile strength, elongation at break

Measured in accordance with JIS K6251.

(2) Normal-state hardness

Measured in accordance with JIS K6253 using a durometer.

(3) Heat resistance

A sample of which the normal-state hardness was measured, was left to stand in a gear oven at 140° C. for 10 days in accordance with JIS K6257, and then the normal-state hardness was measured again to calculate the change in harness of the sample. The smaller the absolute value of the change in harness, the better the heat resistance.

(4) Compression set

Measured in accordance with JIS K6262 (test conditions: left to stand in a gear oven at 120° C. for 70 hours). The smaller this value (%), the higher the restoring force when compressed for a long period of time.

(5) Tension fatigue

The number at break was determined in accordance with JIS K6270 by using a No. 3 test specimen at a test temperature of 40° C. at an elongation percentage of from 0 to 100%. The higher the number at break, the better the tension fatigue.

In Tables 1 and 2, the xanthogen-modified chloroprene rubber is DCR-66 manufactured by Denki Kagaku Kogyo Kabushiki Kaisha, the mercaptan-modified chloroprene rubber is DCR-36 manufactured by Denki Kagaku Kogyo Kabushiki Kaisha, and the sulfur-modified chloroprene rubber is DCR-40A manufactured by Denki Kagaku Kogyo Kabushiki Kaisha.

The carbon black (MT) is Thermax N-990 (number average particle size: 450 nm, DBP oil absorption: 44 ml/100 g) manufactured by Cancarb, the carbon black (FT) is Asahi Thermal FT (number average particle size: 80 nm, DBP oil absorption: 28 ml/100 g) manufactured by Asahi Carbon Co., Ltd., the carbon black (HAF) is SEAST 3 (number average particle size: 28 nm, DBP oil absorption: 101 ml/100 g) manufactured by TOKAI CARBON CO., LTD., the carbon black (SRF) is SEAST S (number average particle size: 66 nm, DBP oil absorption: 68 ml/100 g) manufactured by TOKAI CARBON CO., LTD., the carbon black (FEF) is SEAST SO (number average particle size: 43 nm, DBP oil absorption: 115 ml/100 g) manufactured by TOKAI CARBON CO., LTD., and the carbon black (MAF) is SEAST 116 (number average particle size: 38 nm, DBP oil absorption: 133 ml/100 g) manufactured by TOKAI CARBON CO., LTD.

The plasticizer is VULKANOL OT (ether/thioether plasticizer) manufactured by LANXESS.

As other compounds, commercially available products were used.

TABLE 1

| | Example | | | | | | | | |
|---|---|---|---|---|---|---|---|---|---|
| | 1 | 2 | 3 | 4 | 5 | 6 | 7 | 8 | 9 |
| Xanthogen-modified chloroprene rubber | 100 | 100 | 100 | 100 | | 55 | 70 | 100 | 100 |
| Mercaptan-modified chloroprene rubber | | | | | 100 | 45 | 30 | | |
| Sulfur-modified chloroprene rubber | | | | | | | | | |
| 4,4'-bis(α,α-dimethylbenzyl)diphenylamine | 1 | 1 | 1 | 1 | 1 | 1 | 1 | 1 | 1 |
| 2-mercaptobenzimidazole | | 0.5 | | 0.5 | | | | | 2 |
| 1-benzyl-2-ethyl imidazole | | | | | | | | 0.5 | |
| Carbon black (MT) | 65 | 65 | | | 65 | 65 | 65 | 65 | 65 |
| Carbon black (FT) | | | 65 | 65 | | | | | |
| Carbon black (HAF) | | | | | | | | | |
| Carbon black (SRF) | | | | | | | | | |
| Carbon black (FEF) | | | | | | | | | |
| Carbon black (MAF) | | | | | | | | | |
| N-phenyl-N'-(1,3-dimethylbutyl)-p-phenylenediamine | 1 | 1 | 1 | 1 | 1 | 1 | 1 | 1 | 1 |
| Stearic acid | 1 | 1 | 1 | 1 | 1 | 1 | 1 | 1 | 1 |
| ZnO | 5 | 5 | 5 | 5 | 5 | 5 | 5 | 5 | 5 |
| MgO | 4 | 4 | 4 | 4 | 4 | 4 | 4 | 4 | 4 |
| Ethylenethiourea | 1 | 1 | 1 | 1 | 1 | 1 | 1 | 1 | 1 |
| Tetramethylthiuram disulfide | 0.5 | 0.5 | 0.5 | 0.5 | 0.5 | 0.5 | 0.5 | 0.5 | 0.5 |
| Plasticizer VULKANOL OT | 10 | 10 | 10 | 10 | 10 | 10 | 10 | 10 | 10 |
| Vulcanized product physical properties (vulcanization conditions: press vulcanization at 160° C. for 20 minutes) | | | | | | | | | |
| Tensile strength (MPa) | 16.5 | 17.8 | 20.6 | 21.2 | 15.8 | 16.2 | 16.3 | 17.6 | 18.9 |
| Elongation at break (%) | 439 | 492 | 340 | 394 | 460 | 450 | 445 | 487 | 570 |
| Normal-state hardness (Durometer-A) | 62 | 62 | 63 | 63 | 62 | 62 | 62 | 62 | 63 |
| Heat resistance: left to stand in gear oven at 140° C. for 10 days (change in hardness) | +22 | +22 | +22 | +22 | +22 | +22 | +22 | +22 | +23 |
| Compression set: left to stand in gear oven at 120° C. for 70 hours (%) | 24 | 30 | 26 | 31 | 21 | 22 | 23 | 31 | 39 |
| Tension fatigue 0-100% tension test temperature: 40° C. (ten thousand times) | 80 | 100 or more | 73 | 100 or more | 65 | 71 | 76 | 100 or more | 100 or more |

TABLE 2

| | Comparative Example | | | | | |
|---|---|---|---|---|---|---|
| | 1 | 2 | 3 | 4 | 5 | 6 |
| Xanthogen-modified chloroprene rubber | 100 | 100 | 100 | 100 | 100 | |
| Mercaptan-modified chloroprene rubber | | | | | | |
| Sulfur-modified chloroprene rubber | | | | | | 100 |
| 4,4'-bis(α,α-dimethylbenzyl)diphenylamine | 1 | 1 | 1 | 1 | 1 | 1 |
| 2-mercaptobenzimidazole | | | 0.5 | | | |
| 1-benzyl-2-ethyl imidazole | | | | | | |
| Carbon black (MT) | | | | | | 65 |
| Carbon black (FT) | | | | | | |
| Carbon black (HAF) | 30 | | | | | |
| Carbon black (SRF) | | 40 | 40 | | | |
| Carbon black (FEF) | | | | 30 | | |
| Carbon black (MAF) | | | | | 30 | |
| N-phenyl-N'-(1,3-dimethylbutyl)-p-phenylenediamine | 1 | 1 | 1 | 1 | 1 | 1 |
| Stearic acid | 1 | 1 | 1 | 1 | 1 | 1 |
| ZnO | 5 | 5 | 5 | 5 | 5 | 5 |

TABLE 2-continued

|  | Comparative Example | | | | | |
|---|---|---|---|---|---|---|
|  | 1 | 2 | 3 | 4 | 5 | 6 |
| MgO | 4 | 4 | 4 | 4 | 4 | 4 |
| Ethylenethiourea | 1 | 1 | 1 | 1 | 1 | 1 |
| Tetramethylthiuram disulfide | 0.5 | 0.5 | 0.5 | 0.5 | 0.5 | 0.5 |
| Plasticizer VULKANOL OT | 10 | 10 | 10 | 10 | 10 | 10 |
| Vulcanized product physical properties (vulcanization conditions: press vulcanization at 160° C. for 20 minutes) | | | | | | |
| Tensile strength (MPa) | 23.7 | 20.5 | 21.5 | 22.2 | 20.5 | 21.0 |
| Elongation at break (%) | 420 | 378 | 441 | 360 | 386 | 530 |
| Normal-state hardness (Durometer-A) | 61 | 61 | 61 | 61 | 61 | 61 |
| Heat resistance: left to stand in gear oven at 140° C. for 10 days (change in hardness) | +31 | +29 | +29 | +26 | +27 | +35 |
| Compression set: left to stand in gear oven at 120° C. for 70 hours (%) | 29 | 26 | 38 | 27 | 27 | 77 |
| Tension fatigue 0-100% tension test temperature: 40° C. (ten thousand times) | 70 | 74 | 100 or more | 63 | 65 | 100 or more |

From the results shown in Tables 1 and 2, in Examples, heat resistance is good as compared with Comparative Examples, and mechanical properties such as the tensile strength and the elongation at break, the compression set and the tension fatigue are within a practicable range. Further, in Examples (Examples 3, 4, 8 and 9) in which an imidazole compound is contained, the durability was high such that the number at break of tension fatigue was 1,000,000 or more.

INDUSTRIAL APPLICABILITY

A vulcanized rubber obtainable from the chloroprene rubber composition of the present invention is excellent in heat resistance without impairing mechanical properties, the compression set and the tension fatigue, and is industrially highly useful as a material of a rubber member for an automobile, a hose, a rubber molded article and a rubber vibration insulator.

The entire disclosure of Japanese Patent Application No. 2007-238945 filed on Sep. 14, 2007 including specification, claims and summary is incorporated herein by reference in its entirety.

The invention claimed is:

1. A chloroprene rubber composition, which comprises 100 parts by mass of at least one chloroprene rubber selected from the group consisting of a xanthogen-modified chloroprene rubber and a mercaptan-modified chloroprene rubber, and from 15 to 200 parts by mass of carbon black having a number average particle size of from 70 nm to 600 nm and having a DBP oil absorption of from 15 ml/100 g to 60 ml/100 g by oil absorption method A of JIS K6221.

2. The chloroprene rubber composition according to claim 1, which further contains from 0.1 to 3 parts by mass of an imidazole compound per 100 parts by mass of the chloroprene rubber.

3. The chloroprene rubber composition according to claim 2, wherein the imidazole compound is at least one member selected from the group consisting of 2-mercaptobenzimidazole and 1-benzyl-2-ethylimidazole.

4. A vulcanized rubber obtained by vulcanizing the chloroprene rubber composition as defined in claim 1.

5. A rubber member for an automobile, comprising the vulcanized rubber as defined in claim 4.

6. A hose, comprising the vulcanized rubber as defined in claim 4.

7. A rubber molded article, comprising the vulcanized rubber as defined in claim 4.

8. A rubber vibration insulator, comprising the vulcanized rubber as defined in claim 4.

9. The chloroprene rubber composition according to claim 1, wherein the chloroprene rubber comprises a xanthogen-modified chloroprene rubber.

10. The chloroprene rubber composition according to claim 1, wherein the chloroprene rubber comprises a mercaptan-modified chloroprene rubber.

11. The chloroprene rubber composition according to claim 10, wherein the chloroprene rubber comprises at most 40 mass % of said mercaptan-modified chloroprene rubber to 100 mass % of total chloroprene rubber.

12. The chloroprene rubber composition according to claim 1, which further contains from 0.3 to 1.5 part by mass of an imidazole compound per 100 parts by mass of the chloroprene rubber.

13. The chloroprene rubber composition according to claim 1, wherein the carbon black has a number average particle size of from 80 nm to 500 nm.

14. The chloroprene rubber composition according to claim 1, wherein the DBP oil absorption is from 25 ml/100 g to 50 ml/100 g by oil absorption method A of JIS K6221.

15. The chloroprene rubber composition according to claim 1, wherein the carbon black is present in an amount of from 25 to 100 parts by mass per 100 parts by mass of the chloroprene rubber.

* * * * *